United States Patent [19]

Dyroff

[11] Patent Number: 4,542,206

[45] Date of Patent: Sep. 17, 1985

[54] PROCESS FOR PREPARING POLYMERIC ACETAL CARBOXYLATE COMPOSITIONS

[75] Inventor: David R. Dyroff, Ladue, Mo.

[73] Assignee: Monsanto Company, St. Louis, Mo.

[21] Appl. No.: 627,261

[22] Filed: Jul. 2, 1984

[51] Int. Cl.⁴ .................................................. C08G 2/28
[52] U.S. Cl. .................................... 528/488; 525/398; 525/401; 528/489
[58] Field of Search ................ 528/488, 489; 525/398, 525/401

[56] References Cited

U.S. PATENT DOCUMENTS

| | | | |
|---|---|---|---|
| 4,140,676 | 2/1979 | Crutchfield et al. | 528/231 |
| 4,144,226 | 3/1979 | Crutchfield et al. | 528/231 |
| 4,146,495 | 3/1979 | Crutchfield et al. | 252/89 R |
| 4,204,052 | 5/1980 | Crutchfield et al. | 525/398 |
| 4,225,685 | 9/1980 | Dyroff et al. | 525/401 |
| 4,233,422 | 11/1980 | Dyroff et al. | 528/488 X |
| 4,233,423 | 11/1980 | Dyroff et al. | 528/488 X |

FOREIGN PATENT DOCUMENTS 1148831  6/1983  Canada ............................. 134/3.30

*Primary Examiner*—Lucille M. Phynes
*Attorney, Agent, or Firm*—Jon H. Beusen; J. C. Losomasini; A. H. Cole

[57] ABSTRACT

Solid state compositions having improved storage stability are provided by reacting an aqueous solution or slurry of polymeric acetal carboxylate and alkali metal hydroxide with carbon dioxide to form alkali metal carbonate in intimate admixture with the polymer and recovering the admixture in solid form. The compositions are useful as builders in detergent formulations.

20 Claims, No Drawings

PROCESS FOR PREPARING POLYMERIC ACETAL CARBOXYLATE COMPOSITIONS

This invention relates to polymeric acetal carboxylate compositions useful as complexing agents and detergency builders. More particularly, it relates to a process for preparing compositions comprising said polymers in intimate admixture with alkali metal carbonate.

BACKGROUND OF THE INVENTION

The property possessed by some materials of improving detergency levels of soaps and synthetic detergents and the use of such materials in detergent compositions is known. Such cleaning boosters are called builders and such builders permit the attainment of better cleaning performance than is possible when so-called unbuilt compositions are used. The behavior and mechanisms by which builders perform their function are only partially understood. It is known that good builders must be able to sequester most of the calcium and/or magnesium ions in the wash water since these ions are detrimental to the detergency process. However, it is difficult to predict which class of compounds possess useful combinations of builder properties and which compounds do not because of the complex nature of detergency and the countless factors which contribute both to overall performance results and requirements of environmental acceptability.

Sodium tripolyphosphate (STPP) has been found to be a highly efficient cleaning and detergency builder and this compound has been widely used for decades in cleaning formulations. Indeed, millions of pounds of STPP are used each year in cleaning formulations because of its superior builder qualities. However, because of the recent emphasis on removing phosphates from detergent and cleaning compositions for environmental reasons, the detergent and cleaning industry is now looking for materials suitable for use as builders which do not contain phosphorus and which are environmentally acceptable.

Polymeric acetal carboxylates are suitable as a replacement for STPP in detergent compositions. The preparation of such polymeric acetal carboxylates has been disclosed in U.S. Pat. No. 4,144,226 issued Mar. 13, 1979 and in U.S. Pat. No. 4,204,052 issued May 20, 1980. The use of such polymeric acetal carboxylates in detergent compositions is disclosed in U.S. Pat. No. 4,146,496 issued Mar. 27, 1979. An improved method for the saponification of the esters of the polymeric acetal carboxylates to form the corresponding alkali metal salts is disclosed in U.S. Pat. No. 4,140,676 issued Feb. 20, 1979. An improved method of stabilizing the polymer against rapid depolymerization in alkaline solution by adding an alkyl vinyl ether in the presence of an organo aluminum compound is disclosed in U.S. Pat. No. 4,225,685 issued Sept. 30, 1980. The polymeric acetal carboxylate salts described in the above patents were tested for sequestration function using procedures described by Matzner et al. in "Organic Builder Salts as Replacements for Sodium Tripolyphosphate", TENSIDE, 10, No. 3 pages 119-125 (1973). As a result of such tests, polymeric acetal carboxylate salts were found to be superior detergent builders compared to STPP, and were stable under laundry use conditions but depolymerized at lower pH making the polymers more readily biodegradable.

Although the polymeric acetal carboxylates disclosed in the above patents are excellent sequestering agents and builders, it has now been found that these polymeric acetal carboxylates are subject to degradation of their sequestering capacity upon prolonged storage at elevated temperatures such as found in shipping and warehousing conditions in warm climates. It has now been found that solid compositions comprising polymeric acetal carboxylates in intimate admixture with an alkali metal carbonate are resistant to degradation and retain their sequestering capacity much longer under such storage conditions. In accordance with this invention such intimate admixtures are prepared by reacting an aqueous solution or slurry of the polymer and alkali metal hydroxide with carbon dioxide. This process is particularly advantageous in conjunction with the process of manufacturing the polymer by saponification of a polymeric ester precursor with excess alkali metal hydroxide. In this manner, at least some of the excess alkali metal hydroxide is converted to alkali metal carbonate which forms an intimate admixture with the polymer. Such admixtures can be readily recovered in solid form and are resistant to degradation during storage.

SUMMARY OF THE INVENTION

These and other advantages are achieved by a process which comprises reacting an aqueous solution or slurry of a polymeric acetal carboxylate and alkali metal hydroxide with carbon dioxide to form alkali metal carbonate in intimate admixture with the polymeric acetal carboxylate and recovering the admixture in solid form.

The compositions prepared in accordance with this invention are resistant to degradation of the polymeric acetal carboxylate at elevated temperatures encountered in shipping and storage of the polymeric acetal carboxylate when exposed in concentrated form as a sequestering agent or detergency builder as well as in the form of finished formulations such as built detergents containing the polymeric acetal carboxylate builders and surfactants.

DETAILED DESCRIPTION OF THE INVENTION

The polymeric acetal carboxylate compound has the following empirical formula:

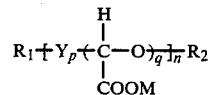

wherein Y is one or more comonomers randomly distributed in the polymer; n averages at least 4; p is 0 to an average of about 5; q is at least 1; $R_1$ and $R_2$ are individually any chemically stable group which stabilizes the polymer against rapid depolymerization in alkaline solution; and M is alkali metal.

The preparation and builder properties of these polymeric acetal carboxylates are described in U.S. Pat. No. 4,144,226 issued Mar. 13, 1979 to Crutchfield et al. and U.S. Pat. No. 4,246,495 issued Mar. 27, 1979 to Crutchfield et al, both incorporated herein by reference.

These polymeric acetal carboxylates can be prepared by bringing together in a reaction zone under polymerization conditions an ester of glyoxylic acid, optionally one or more comonomers and a polymerization initiator to form a polymer represented by the empirical formula:

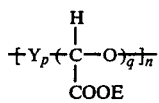

wherein E is an alkyl group having 1 to about 4 carbon atoms and Y, p, q and n are as defined above. The resulting polymer is then reacted at its termini with a reagent which produces a chemically stable end group, $R_1$ and $R_2$, to stabilize the polymer against rapid depolymerization in alkaline solution. The term "rapid depolymerization in alkaline solution", as used herein, means that in an aqueous solution of 0.5 molar sodium hydroxide containing 10 grams per liter of polymeric acetal caboxylate, the average chain length of the polymer will be reduced by more than 50 percent, as determined by Proton Magnetic Resonance, after 1 hour at 20° C. The polymer is then reacted with a base such as lithium hydroxide, sodium hydroxide, potassium hydroxide, and the like to make a salt suitable for use as a builder and as a sequestrant.

A preferred method of stabilizing the polymer against rapid depolymerization in alkaline solution by adding an alkyl vinyl ether in the presence of an organo-aluminum compound is described in U.S. Pat. No. 4,225,685 issued Sept. 30, 1980 to Dyroff et al, incorporated herein by reference.

A preferred method of saponifying the polymeric acetal carboxylate ester to its alkali metal salt by bringing together in a reaction zone the polymeric ester and an excess, say 10 molar percent over the required stoichiometric amount, of at least 5 normal alkali metal hydroxide is described in U.S. Pat. No. 4,140,676 issued Feb. 20, 1979 to M. M. Crutchfield et al., which is incorporated herein by reference.

In the process of the present invention, storage stable compositions are prepared by reacting an aqueous solution or slurry of the polymeric acetal carboxylate and alkali metal hydroxide with carbon dioxide to form alkali metal carbonate in intimate admixture with the polymer and recovering the admixture in solid form.

Alkali metal hydroxides useful in accordance with this invention are, for example, lithium, sodium or potassium hydroxides, sodium and potassium hydroxides are preferred. Particularly preferred is sodium hydroxide. Although the alkali metal of the hydroxide and the polymer can be different, it is preferred that they are the same.

The reaction of carbon dioxide to form alkali metal carbonate can be conducted under various conditions. Effective reaction can occur over a wide range of temperature, pressure, alkaline pH, liquid vehicle composition, and the like, and the degree of effectiveness of any combination of such parameters can be readily determined by routine experimentation in view of the present description.

Temperatures in the range of about 0° C., or lower, to about 100° C. can be employed. Preferably, the reaction is conducted in the range of about 20° C. to about 75° C.

The reaction can be conducted at atmospheric, sub-atmospheric or super atmospheric pressures. Good results are obtained at ambient pressures which are preferred for convenience.

It is preferred that the pH of the reaction mixture be maintained above about 9.5, more preferably above about 10.0. In a preferred embodiment of this invention, the carbon dioxide is reacted with the reaction mixture obtained after saponification of the ester precursor of the polymer with an excess of sodium hydroxide, and the amount of gaseous carbon dioxide reacted with said mixture is sufficient to provide an intimate admixture of alkali metal carbonate and polymer containing at least 1%, more preferably at least 3%, by weight alkali metal carbonate while maintaining the pH of the reaction mixture greater than about 9.5.

The liquid vehicle in which carbon dioxide is reacted with alkali metal hydroxide can be water or a water/solvent mixture. A water/lower alkanol mixture is preferred, particularly a water/methanol mixture. Suitable water/methanol mixtures are formed in the saponification of the methyl ester precursor of the polymer with excess aqueous alkali metal hydroxide, and such a reaction mixture is particularly suitable for preparing storage stable polymeric acetal carboxylates in accordance with this invention. The addition of methanol to the reaction mixture after reacting with carbon dioxide is advantageous to fully precipitate the intimate admixture prior to recovering it in solid form.

The amount of the alkali metal hydroxide employed in the practice of this invention can vary widely provided that a sufficient amount is present to react with the carbon dioxide to form alkali metal carbonate in intimate admixture, preferably at least 1%, more preferably at least 3%, by weight and the pH of the reaction mixture is maintained above about 9.5. Greater amounts of alkali metal carbonate are not detrimental to the improved storage stability of the resulting product and amounts of 15% by weight, or more, alkali metal carbonate can be used.

In the most preferred embodiment of this invention, the amount of the alkali metal hydroxide, preferably sodium hydroxide, remaining in the reaction mixture after saponification of the polymeric acetal carboxylate ester precursor with excess aqueous alkali metal hydroxide is adequate for the reaction with carbon dioxide, without further addition of alkali metal hydroxide. In this manner storage stable polymeric acetal carboxylate compositions are provided making use of at least a portion of the excess alkali metal hydroxide used for saponification which usually is discarded or reconcentrated for recycle in the prior process described in U.S. Pat. No. 4,140,676.

The presence of alkali metal hydroxides alone in admixture with the polymer is not suitable for preparing useful storage stable compositions because at effective levels it results in excessively high product alkalinity which makes the material significantly more hazardous for use in consumer products. In precipitating the saponification product with water/alkanol mixtures most of the excess alkali metal hydroxide remains in solution in the liquid phase and does not coprecipitate with the polymeric acetal carboxylate.

The storage stable products made in accordance with the present invention should be alkaline. The preferred range of pH (measured as 0.6% aqueous solution) is about 9.5 to 11.0, with the range of 10.0-10.8 particularly preferred. The intimate admixture of alkali metal carbonate and polymer formed in the present process can be efficiently precipitated from an aqueous medium in the presence of a sufficient amount of alkanol, preferably methanol, which is highly advantageous for product recovery since alkanol is formed in the saponification of the polymeric acetal carboxylate ester precursor in the process for producing the alkali metal salt of the polymer having sequestering and detergent builder properties.

Where it is desired to recover the product from aqueous solution without employing precipitating solvents, the amounts of alkali metal hydroxide and carbon dioxide employed must be sufficient to provide an intimate admixture of at least 1% by weight, preferably at least 3% by weight of alkali metal carbonate. Any excess alkali metal hydroxide can be further neutralized by the reaction of carbon dioxide, since the presence of excess alkali metal carbonate is not detrimental and is often advantageous, and the intimate admixture can be recovered via evaporation.

It is preferred to recover the admixture by precipitation. The precipitated admixture can be separated using conventional processes such as filtration, settling, centrifugation, etc. The resulting moist solids can be washed, if desired, and dried by any number of methods such as flashdrying, tray drying in an oven or at ambient temperature, rotary drying, etc. The dried solids can be crushed, screened, milled, etc. Such finishing procedures can be used without destroying the stabilizing effect of the alkali metal carbonate, provided that the polymer and alkali metal carbonate remain in intimate admixture and the admixture is not subjected to excessive acidic conditions.

In all finishing steps, it is important to avoid excessive acidification of the product. Thus, if recovered solids are washed, it is preferable to employ a wash solution which is sufficiently basic to preserve a solids pH of at least 9.5, preferably 10-11 even at the surface of the solids. Of course, such washing must be conducted to avoid excessive dissolution and loss of the basic additive. Examples of suitable wash solutions include methanol containing 0.4% by weight of 50% aqueous NaOH, methanol saturated with sodium carbonate, and the like. In drying, excessive contact with acidic combustion gases should be avoided. The tolerable degree of contact with any particular acidic gas mixture during drying can be determined by routine experimentation.

During drying of the admixture product, excessive exposure to high temperatures should be avoided since product degradation can result. Appropriate time and temperature limits for any given method of drying can be determined by routine experimentation. The degree of dryness of the final product can be varied widely. Excessive drying tends to produce a hygroscopic product, while insufficient drying tends to produce a sticky product. A preferred range for final percent volatiles of the solid product is about 8-14% by weight.

Conditions of preparation of the polymeric acetal carboxylate component useful in the present process can vary widely and many of the resulting variations in the polymer can affect its properties. Examples of such variations are different terminal structures at the polymer chain ends, different chain length distributions, different degrees of dryness, different degrees of homogeneity, different contents of various by-products or impurities, different degrees of basicity, different salts of the polymer, etc. While such variations will affect both the storage stability of the polymeric acetal carboxylate and the degree of improvement obtained by the process of this invention, in each case the stability of the intimate admixture will be enhanced. Polymer component characteristics which result in relatively high hydrolytic stability at a high pH as well as a sufficiently high rate of hydrolysis in waste water at lower pH to satisfy environmental concerns are preferred.

Particularly preferred compositions produced in accordance with this invention are particulate compositions which comprise an effective amount of alkali metal carbonate in intimate admixture with a polyacetal carboxylate having the structure

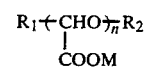

wherein M is sodium or potassium; n averages at least 4 (preferably 50 to 150); $R_1$ and $R_2$ are individually any chemically stable group which stabilizes the polyacetal carboxylate against rapid depolymerization in alkaline solution; and the polyacetal carboxylate segments comprise at least 50% by weight of the total polymer. Preferably, at least one of $R_1$ and $R_2$ is derived from ethyl vinyl ether.

The polymeric acetal carboxylate admixtures produced in accordance with this invention are particularly useful as detergency builders in detergent formulations such as described in U.S. Pat. No. 4,146,495 issued Mar. 27, 1979 to Crutchfield et al and Canadian Pat. No. 1,148,831 issued June 28, 1983 to Rodriquez et al., both incorporated herein by reference.

The degradation of the polymeric acetal carboxylate under conditions of elevated temperatures occurring during shipping and storage in warm climates was evaluated using the following procedure.

A 0.6 gram sample of the product was stored in a tightly closed 4 ounce glass bottle and maintained at 49° C. for a period of 2-6 weeks. The amount of final sequestration activity or polymer content of the product was determined at the end of the exposure period. For the most accurate determination of storage stability, an exposure time of 4-6 weeks is preferred. The sequestration activity or polymer content can be determined by measurement of the product calcium sequestration capacity or by measurement of its polymer content by means of high performance liquid chromatography. Similar results are obtained by either method. The calcium sequestration method requires less elaborate equipment and the following method can be used with good results.

A sample of the product is dissolved in deionized water to form a solution slightly more concentrated than 0.6% by weight, adjusted to pH 10.0 with 1 N NaOH or HCl, and diluted to exactly 0.600% with deionized water. A portion of this solution is charged to the reservoir of an automatic titrator equipped with a calcium selective electrode. Exactly 100 mls of $10^{-3}M$ $CaCl_2$ solution, adjusted to pH 10.0 with 1 normal NaOH, is titrated with the sample solution with stirring at a titrant feed rate of 2 ml/minute. Titration is continued until well past the equivalence point of a titration curve on the recorder chart of the titrator, usually 10 ml or less of titrant. The titration is repeated using a sample of standard sodium tripolyphosphate (STPP) in place of the product sample. For each of the two titrations, the equivalence point is determined graphically, and the number of ml of titrant required to reach the equivalence point is measured. The calcium sequestration activity of the product sample is then calculated as follows:

$$\% \text{ of STPP} = \frac{\text{ml STPP solution to equiv. pt.}}{\text{ml product solution to equiv. pt.}} \times 100$$

The initial activity was determined for an otherwise identical sample which had not been exposed to aging at 49° C. The percentage loss of activity per week of exposure was then calculated as follows:

$$L = \frac{A_i - A_f}{A_i} \times \frac{100\%}{N}$$

where:
$A_i$ is the initial activity
$A_f$ is the final activity
N is the number of weeks exposure
L is the rate of activity loss (% per week).

The compositions made in accordance with this invention, when tested for stability as described above, lose calcium sequestration capacity at a rate not exceeding about 5% per week. In the most preferred embodiments of this invention the rate of loss of calcium sequestration capacity does not exceed about 2% per week. The percentages referred to are percentages of the initial calcium sequestration capacity of the product. Thus, a loss of 100% represents total loss of the original calcium sequestration capacity.

The invention is further illustrated by, but not limited to, the following Examples wherein all parts and percentages are by weight, unless otherwise indicated.

EXAMPLE 1

This Example illustrates the degradation of the sequestration activity of the polymeric acetal carboxylates in the absence of alkali metal carbonate.

A batch of polymeric acetal carboxylate sodium salt having an average structure

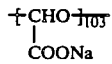

with chain ends stabilized by addition of ethyl vinyl ether was prepared generally as taught by U.S. Pat. No. 4,225,685. Freshly distilled methyl glyoxylate in methylene chloride is polymerized using triethyl amine initiator to form the ester polymer which is endcapped using ethyl vinyl ether in the presence of an organoaluminum endcapping catalyst and saponified with excess sodium hydroxide. The polymer product is precipitated using methanol and filtered and dried. The pH of the product was about 9.9 and the initial calcium sequestration capacity was 143% of STPP. Two samples of this material were evaluated using the above described procedure to determine storage stability. One sample was exposed for two weeks and its average rate of calcium sequestration activity loss was about 15% per week and the other sample was exposed for five weeks and its activity loss averaged 20% per week.

The following Examples illustrate the unexpected advantages of the present invention.

EXAMPLE 2

A sample of the polymeric acetal carboxylate prepared in accordance with Example 1 weighing 30 g was mixed with 3.6 g sodium hydroxide, 58.6 g H₂O and 9.0 g methanol to form a slurry which was heated to 70° C. With stirring gaseous carbon dioxide was added to the slurry to convert a substantial portion of the sodium hydroxide to sodium carbonate. Approximately 53 g of methanol was added to reduce the solubility of the polymer and the sodium carbonate. The slurry was cooled and filtered to recover the solids, washed with a solution of 0.2% sodium hydroxide in methanol and dried. The pH of a 0.6% aqueous solution of the product was 9.72 and the product contained 5.24% sodium carbonate. A sample of this admixture was evaluated for storage stability as above. The average rate of calcium sequestration activity loss was about 0.35% per week.

EXAMPLE 3

A batch of polymeric acetal carboxylate methyl ester precursor with the backbone structure

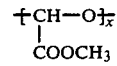

dissolved in methylene chloride, was prepared in accordance with the procedure of Example 1. A sample of this material containing about 90 g of polymer was saponified with excess aqueous NaOH(53 g NaOH, 194 g H₂O) at 55°–65° C., the methylene chloride being boiled off. The resulting polymer had an average structure

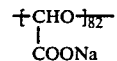

with chain ends stabilized by addition of ethyl vinyl ether. Gaseous carbon dioxide was added with stirring converting a substantial portion of the excess sodium hydroxide to sodium carbonate. Methanol was then added to reduce the solubility of both the polymer and the sodium carbonate. The solids were recovered by filtration, washed with methanol saturated with sodium carbonate, and dried. The product contained 6.5% sodium carbonate, and the pH of a 0.6% aqueous solution of the product was 10.26. A sample of this product was evaluated for storage stability and demonstrated an average rate of calcium sequestration activity loss of about 0.18% per week.

This procedure was repeated except that the product was not washed with methanol saturated with sodium carbonate prior to drying. For this product, the sodium carbonate content was 6.2%, the product pH was 10.40 and the activity loss was about 0.18% per week.

EXAMPLES 4–9

Following the procedure of Example 2, a number of slurries were prepared each containing 30 g of the polymeric acetal carboxylate, and various amounts of NaOH, methanol, and water. The mixtures were heated to drive off most of the methanol and dissolve the solids. These samples were cooled to 65°–70° C. and gaseous carbon dioxide was then added to generate Na₂CO₃ in situ. The product was precipitated with methanol, filtered, washed with basic methanol and dried. The pH of a 0.6% aqueous solution of the product was determined and the admixture was evaluated for storage stability as above. The results are set forth in Table I.

TABLE I

| Example No. | 4 | 5 | 6 | 7 | 8 | 9 |
|---|---|---|---|---|---|---|
| Wt. NaOH(g) | 5.0 | 5.0 | 5.0 | 3.55 | 3.2 | 3.2 |

TABLE I-continued

| Example No. | 4 | 5 | 6 | 7 | 8 | 9 |
|---|---|---|---|---|---|---|
| Mixture State at $CO_2$ addition | solu. | solu. | solu. | slur. | slur. | slur. |
| % $Na_2CO_3$ in Product | 3.39 | 4.18 | 5.86 | 4.91 | 4.63 | 3.38 |
| Product pH | 10.32 | 10.25 | 10.50 | 10.42 | 10.11 | 10.14 |
| Activity Loss Avg./wk. (%) | 1.21 | 0.39 | 2.01 | 2.27 | 0.36 | 0.54 |

EXAMPLES 10–14

Following the general procedure of Examples 4–6, a number of runs were made to produce an intimate admixture of sodium carbonate and polymeric acetal carboxylate sodium salt. Conditions of preparation and starting materials varied. The results shown in Table II below, further illustrate the superior storage stability of the compositions prepared in accordance with this invention.

TABLE II

| Example | Product pH | % wt $Na_2CO_3$ | % Activity Loss/Wk |
|---|---|---|---|
| 10 | 9.78 | 1.81 | 1.32 |
| 11 | 10.11 | 3.0 | 0.17 |
| 12 | 10.03 | 4.0 | 1.05 |
| 13 | 10.12 | 3.3 | 0.98 |
| 14 | 10.65 | 2.41 | 1.58 |

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A process which comprises reacting an aqueous solution or slurry of a polymeric acetal carboxylate and alkali metal hydroxide with carbon dioxide to form alkali metal carbonate in intimate admixture with the polymeric acetal carboxylate and recovering the admixture in solid form.

2. The process of claim 1 wherein the polymeric acetal carboxylate has the empirical formula:

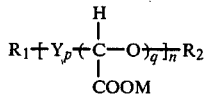

wherein Y is one or more comonomers randomly distributed in the polymer; n averages at least 4; p is 0 to an average of about 5; q is at least 1; $R_1$ and $R_2$ are individually any chemically stable group which stabilizes the polymer against rapid depolymerization in alkaline solution; and M is alkali metal.

3. The process of claim 2 wherein p is 0, q is 1 and M is sodium or potassium.

4. The process of claim 3 wherein at least one of $R_1$ and $R_2$ is derived from ethyl vinyl ether.

5. The process of claim 4 wherein n averages in the range of 20 to 200.

6. The process of claim 4 wherein the alkali metal hydroxide is sodium or potassium hydroxide.

7. The process of claim 4 wherein the alkali metal carbonate is at least 1% by weight of the admixture.

8. The process of claim 6 wherein the alkali metal hydroxide is sodium hydroxide and the sodium carbonate is at least 3% by weight of the admixture.

9. The process of claim 7 wherein the reaction is conducted with a slurry of the polymeric acetal carboxylate in a water/methanol mixture.

10. A process for producing a polymeric acetal carboxylate composition having improved storage stability which comprises saponifying a polymeric acetal carboxylate ester with excess aqueous alkali metal hydroxide to form the alkali metal salt of the polymeric acetal carboxylate, reacting the resultant reaction mixture with carbon dioxide to form alkali carbonate in intimate admixture with the alkali salt of the polymeric acetal carboxylate and recovering the admixture in solid form.

11. The process of claim 10 wherein the alkali metal is sodium or potassium.

12. The process of claim 10 wherein the alkali metal carbonate is at least 1% by weight of the admixture and the admixture has an average rate of activity loss not in excess of about 5% per week at 49° C.

13. The process of claim 10 wherein the alkali metal salt of the polymeric acetal carboxylate has the empirical formula:

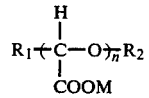

wherein M is alkali metal; n averages at least 4; $R_1$ and $R_2$ are individually any chemically stable group which stabilizes the polymeric acetal carboxylate against rapid depolymerization in alkaline solution; and the polyacetal carboxylate segments comprise at least 50% by weight of the total polymer.

14. The process of claim 13 wherein the alkali metal is sodium and the sodium carbonate is at least 1% by weight of the admixture.

15. The process of claim 14 wherein n averages in the range of 50 to 150 and the sodium carbonate is at least 3% by weight of the admixture.

16. The process of claim 15 wherein at least one of $R_1$ and $R_2$ is derived from ethyl vinyl ether.

17. The process of claim 16 wherein the recovered admixture in 0.6% by weight aqueous solution has a pH in the range 9.5–11.

18. The process of claim 16 wherein the reaction is conducted at a temperature in the range of about 20° to about 75° C.

19. The process of claim 18 further comprising adding methanol to the reaction mixture to precipitate the admixture and drying the admixture to a final percent volatiles in the range of about 8–14 by weight.

20. The process of claim 19 wherein the dried admixture has an average rate of activity loss not in excess of about 2% per week at 49° C.

* * * * *